United States Patent Office 3,520,522
Patented July 14, 1970

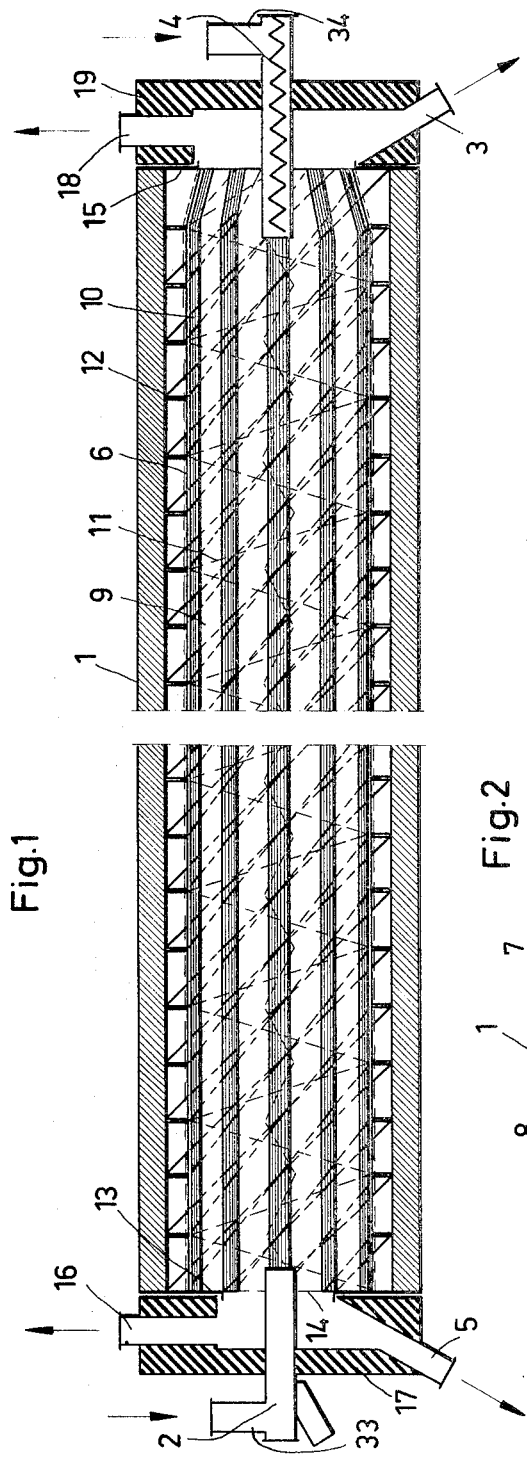

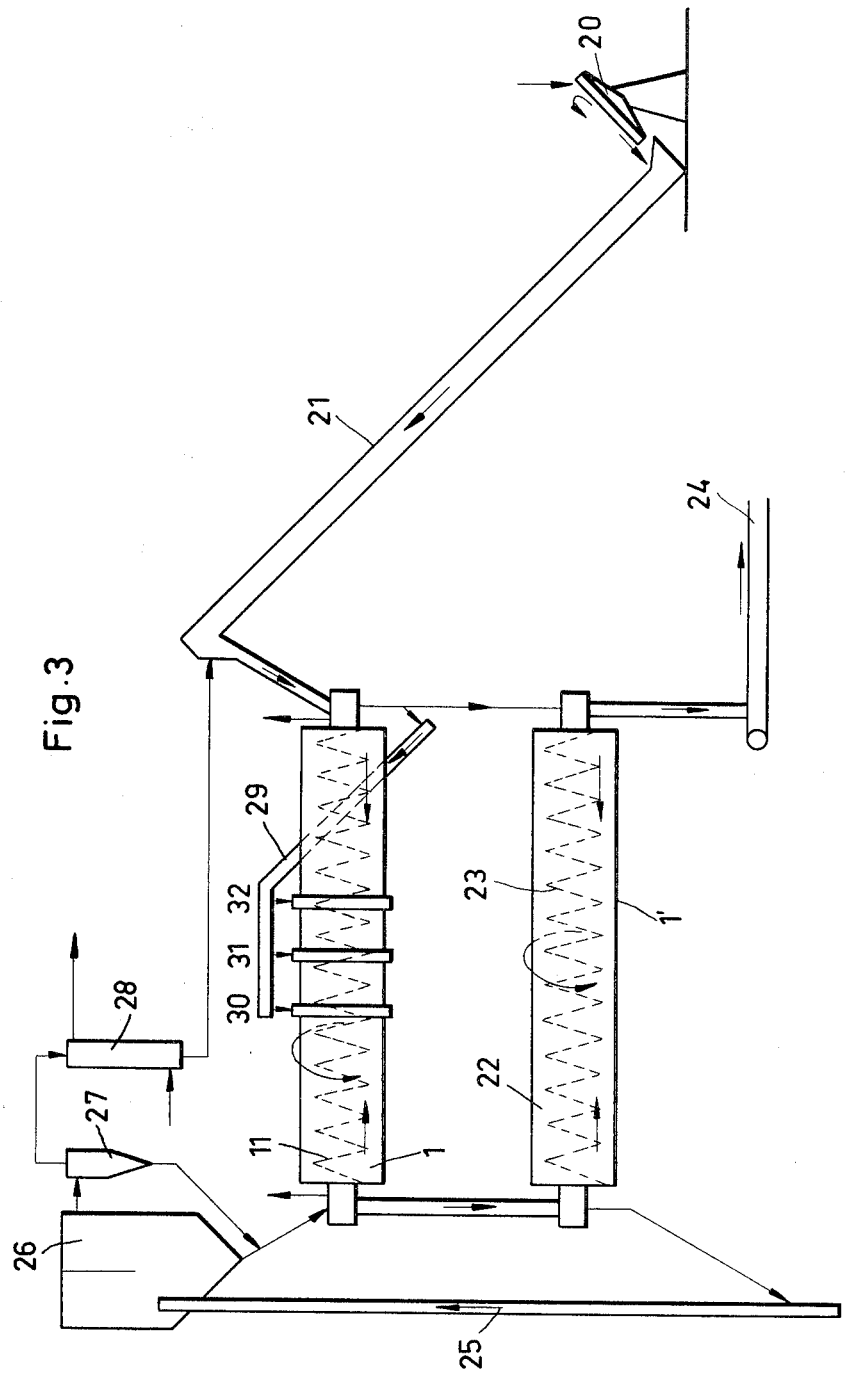

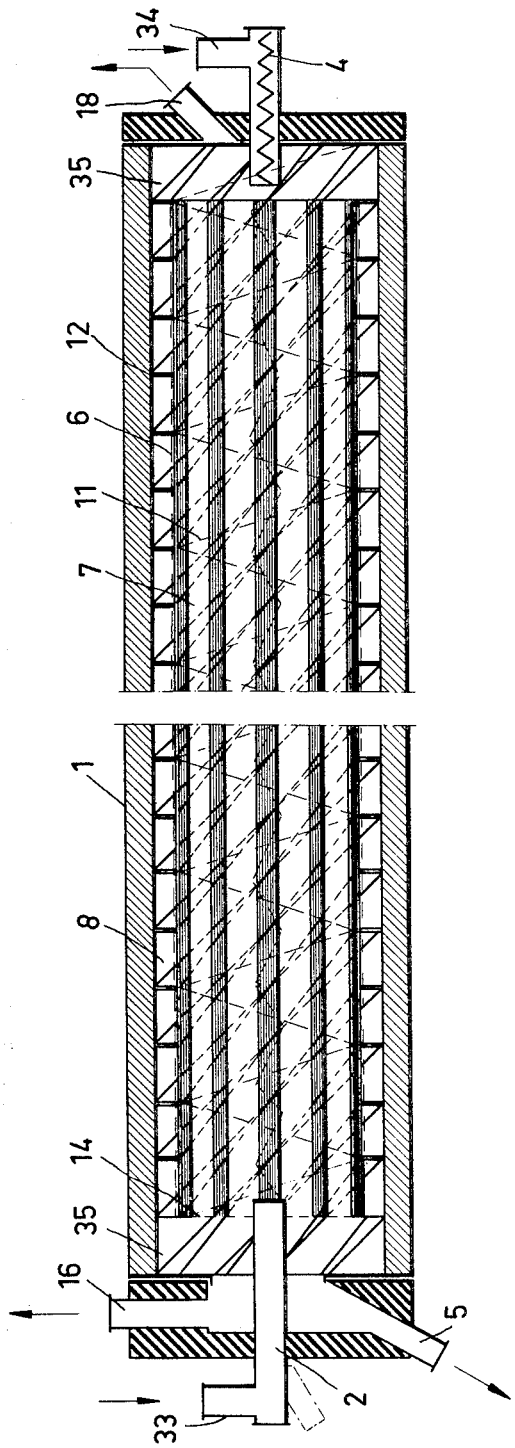

3,520,522
SCREW CONVEYOR FOR HEAT TREATING BULK FEED
Paul Schmalfeld, Bad-Homburg vor der Hohe, and Roland Rammler and Guglielmo Schultz, Frankfurt am Main, and Gerd Schwinn, Heusenstamm, Germany, assignors to Metallgesellschaft Aktiengesellschaft, Frankfurt am Main, Germany
Filed Sept. 18, 1968, Ser. No. 760,439
Claims priority, application Germany, Sept. 21, 1967, 1,583,472
Int. Cl. F27b 7/14
U.S. Cl. 263—33                           25 Claims

ABSTRACT OF THE DISCLOSURE

Raw bulk feed is charged into one end of a rotary tube and hot heat carrier material into the other end of the tube. Two oppositely pitched conveyors in the tube move the bulk feed and heat carrier material in countercurrent flow whereby they are mixed and the bulk feed heated.

---

This invention relates to an apparatus for heat treating granular bulk feeds. In particular, it is composed of a rotary tube containing special internal fittings for continuously conveying the bulk feed axially through the rotating tube in countercurrent to fine-grained heat carrier materials which are repeatedly separated from the bulk feed and reintroduced into the tube at points nearer the entry end of the bulk feed into the tube.

For heat treating bulk feeds with inert heat carrier materials numerous machines have already been proposed. In one previously proposed process for the low-temperature carbonization of briquettes and lumpy bituminous coal, the feed that is to be treated is very rapidly heated by contact in concurrent flow with a hot sand. In a similar process, coal briquette are raised to devolatilization temperature in concurrent contact with inert heat carrier materials. However, this latter process has the drawback that the transfer of heat from the heat carriers to the treated bulk feed proceeds at such a high rate that the method cannot be used for instance for the coking of solid fuels.

It has therefore been proposed to divide a rotating tube by a double diametrical wall into two semicylindrical chambers. Flights attached to the double wall convey the material that is to be devolatilized first through the first chamber and then back again through the second chamber. Owing to the rotation of the tube, hot sand introduced into the second chamber falls through a perforated dividing wall alternately from one chamber into the other, heating the treated feed during this process.

An improvement on this method is that in which a lumpy feed is treated with fine-grained heat carriers in a rotating tube by first contacting the treated feed with the heat carrier material near the discharge end of the feed for entrainment thereby for a short distance and by then reintroducing the heat carrier material at a point further upstream, the process being repeated until the heat material has reached the beginning of the stream of feed. After having left the rotating tube, the heat carrier material is separated on a screen.

This method is further improved by a proposal according to which a coarse-grained bulk feed continuously travels axially through the length of a rotary tube and the fine-grained material is conveyed by conveying means in countercurrent flow thereto. Helical flights attached to the wall of the rotary tube repeatedly separate the fine-grained material from the coarse-grained material and reintroduce the former at a point nearer the entry end of the coarse-grained feed.

However, this method has not found favor in practice because the flights are either not sufficiently effective or not sufficiently resistant to heat or too expensive if they are sufficiently resistant to heat.

In view of this fact, arrangements have been proposed which do not require the provision of special flights inside the rotary tube inasmuch as balls are used as heat carrier elements and conveyed in countercurrent flow to the treated material through the rotary tube. After having yielded their heat to the treated material, the balls are lifted out of the treated bulk material on grate-like trays at the discharge end of the tube. However, this process has also failed to gain acceptance in practice because, owing to the absence of all fittings, the throughput rate is too low to permit the plant to operate economically.

It is the object of this invention to eliminate the shortcomings of these prior art methods.

According to this invention, there is provided apparatus for thermally treating a granular bulk feed, wherein a rotary tube which has its axial ends partly closed by two centrally disposed annular baffles contains a rigidly fitted conveyor screw having flights consisting of screens so disposed that between the external circumference of the screw and the shell of the tube an annular chamber remains which is separated from the interior of the tube by a shrouding consisting of alternating strips of sheet metal and screens, and which contains fixed helical sheet metal flights which have a pitch of opposite hand to that of the conveyor screw, the flights serving for continuously conveying the bulk feed axially through the rotary tube in countercurrent to a fine-grained heat carrier material, whereby the latter is repeatedly separated from and then reintroduced into the bulk feed at a point nearer its entry into the rotary tube.

The rotary tube may be between 10 and 100 meters and preferably between 30 and 60 meters in length and may have an internal diameter between 1 and 6 and preferably between 3 and 5 meters. The screw conveyor which is rigidly fitted centrally in the tube is formed by screens and has a linear pitch between 100 and 1000 mm., preferably between 300 and 600 mm., an annular chamber being formed between the circumference of the screw conveyor and the inner wall of the rotary tube, said annular chamber having a radial height accounting for between 2 and 20% and preferably between 5 and 10% of the internal diameter of the rotary tube. In this annular chamber, helical flights pitched at an angle of 30 to 60°, preferably 45°, are so affixed to the walls that the hand of the helix thus formed is contrary to the hand of the conveyor screw.

The annular chamber is separated from the interior of the rotary tube by a shrouding which consists of alternated sheet metal and screen sections. The mesh of the screens forming the conveyor screw and part of the internal shrouding of the annular chamber is between 3 and 20 mm., and preferably between 8 and 14 mm., and therefore so chosen that the bulk feed which is to be treated inside the rotary tube is retained on the screens whereas the fine-grained heat carrier material has a grain size which can pass through the screens.

This apparatus permits the heat carrier material to be repeatedly separated from the treated bulk feed and to be reintroduced at points nearer the entry end of the treated feed into the rotary tube, the heat carrier material being lifted by the sheet metal sections of the flights during rotation of the tube and conveyed in countercurrent flow to the direction of travel of the treated bulk feed. The heat carrier material then flows down again onto the treated feed and fills all the interstitial spaces between the feed particles. This action ensures a satisfactory heat exchange between the heat carrier material and the components of the bulk feed.

In order to ensure a free discharge of the bulk feed from the central conveyor screw, the rear end of the screw flights is decreased to the internal diameter of an annular baffle which is centrally fitted into the rear end of the rotary tube, and the pitch of the conveyor screw in this part of the rotary tube is increased by 20 to 50% in conformity with its reduced diameter. At the same time as the diameter of the conveyor screw becomes smaller, the sheet metal flights in the annular chamber are proportionately increased in height. This promotes a more rapid axial displacement of the heat carrier material so that hot heat carrier material cannot be discharged together with the fully treated bulk feed.

The front end of the rotary tube is likewise fitted with an annular baffle of which the internal diameter determines the upper level of heat carrier material accumulating in the treated feed.

For particular feeds, it has been found best to shape the sheet metal flights in the annular chamber so that they form pockets of which the floors are pitched at an angle of 30 to 60°, preferably at 45°. This also operates to promote an even distribution of the heat carrier material on the bulk feed inside the rotary tube and it also increases the rate of travel of the heat carrier material on the bulk feed inside the rotary tube and it also increases the rate of travel of the heat carrier material through the rotary tube.

In the case of some bulk feeds, it is necessary to conduct them for some time through a constant temperature zone. Such a zone can be created by providing the circumference of the shell of the rotary tube with openings through which some of the cooled heat carrier material that has already been discharged from the rotary tube can be reintroduced into the interior of the tube.

According to the proportion of heat carrier material to the bulk feed and according to the particle size of the bulk feed, the rotary tube may be set at an angle of inclination between 0 and 10°, preferably between 2 and 4°, to the horizontal.

The speed of rotation of the tube may be controllably varied between 0.1 and 2 r.p.m., preferably between 0.1 and 1 r.p.m.

In the stationary head of the rotary tube at the front and/or rear end of the tube, a flue may be provided to carry away any gases evolved inside the rotary tube.

The bulk feed that is to be treated as well as the heat carrier material are preferably charged into the rotary tube through the openings of the annular baffles at the front and rear ends of the tube with the air of screw feeders, vibratory feeders or like devices.

At the front end of the tube, an annular opening remains between the outer diameter of the feeder device and the inside diameter of the annular baffle to permit the heat carrier material to be discharged through this opening. The ring-shaped opening may be closed by a screen to prevent the entering fresh bulk feed from being discharged at this point.

The bulk feed leaving the rotary tube as well as the discharge heat carrier material are carried away through pipes in the stationary heads of the rotary tube.

In order to permit the hot treated bulk feed to be cooled inside the rotary tube itself, a gap of a width between 100 and 1000 mm., preferably between 200 and 500 mm., may be left open between the baffle at the rear end of the tube and the internal shroud of the annular chamber, for the introduction therethrough of the heated bulk feed into the annular chamber. When this is done, the hot bulk feed will at first still pick up some heat from the hot heat carrier material but as the heat carrier material becomes cooler it will itself become cooler.

The means by which the objects of this invention are obtained are described more fully with reference to the accompanying schematic drawings, in which:

FIG. 1 is a longitudinal axial cross-sectional view through the apparatus for heat-treating briquettes of bituminous coal;

FIG. 2 is a transverse cross-sectional view through the apparatus shown in FIG. 1;

FIG. 3 is a plant diagram of a plant for heat-treating and subsequently cooling briquettes of bituminous coal; and FIG. 4 is a longitudinal axial cross-sectional view through a modification of the apparatus shown in FIG. 1.

Referring now to FIGS. 1 and 2, there is shown apparatus for heat-treating pellets of bituminous coal comprising a rotary tube 1 into the interior 7 of which an electromagnetic oscillating feeder 2 is arranged to charge the bulk feed pellets at a temperature of 70° C. and this feed is then continuously conveyed through the tube 1 by a conveyor screw 11. At the same time a screw feeder 4 at the right hand end of the rotary tube 1 introduces hot sand at a temperature of 900° C. Sheet metal flights 12 in an annular chamber 8 of the rotary tube convey this material in counter-current to the coal pellets that are to be coked. The rotation of the tube 1 causes the hot sand to be lifted by strip-shaped sheet metal shrouds 9 which connect the flights 12 and then to be discharged through screen strips 10 interposed between the sheet metal shrouds so that it falls onto the banked up pellets inside the rotary tube 1 and penetrates the gaps to accumulate at the bottom of the rotary tube 1 where it again enters the annular chamber 8 through the screening strips 10 between the sheet metal shrouds. This process repeats itself until the hot sand reaches the left hand end, FIG. 1, of rotary tube 1. The described process provides an intense heat exchange in the course of which the coal pellets which are to be coked accept sufficient heat from the sand for the temperature difference between the two materials not to exceed about 100° C. anywhere throughout the length of the rotary tube 1.

This temperature difference changes only at the front and rear ends of the rotary tube 1 if the heat capacities of the two materials differ considerably. At the front (left hand) axial end of the rotary tube 1, the sand is discharged through an exit pipe 5 at a temperature between 100 and 250° C. An annular baffle 13 at the front end of the rotary tube 1 has an internal diameter chosen to maintain sufficient hot sand in the rotary tube to fill the entire interstitial cavities in the bed of pellets. The sand is discharged through a screen 14 which closes the inside opening of the annular baffle 13 and which has a mesh permitting only the sand to pass through, whereas the coal pellets are retained. At the rear end (right hand end in FIG. 1) of the rotary tube 1, a similar annular baffle 15 is provided which prevents the hot sand that has been introduced from flowing out. Towards the rear end of the rotary tube 1 the diameter of the internal shrouding 6 of the annular chamber is reduced to the internal diameter of the annular baffle 15. This involves a proportional reduction in the diameter of the conveyor screw and an increase in the pitch of its flights, as well as an increase in the height of the flights 12 at this end of the rotary tube 1. This arrangement causes the entering hot sand to be conveyed quickly across the fully coked pellets at this end of the rotary tube 1. The temperature of the discharged coked pellets is between 700 and 900° C., depending upon the respective heat capacities of the sand and pellets.

The pellets are discharged through the rear head 19 of the rotory tube and emerge through a pipe 3 as the product. The gases and vapors evolved during the process of coking are removed through either or both flues 16 and 18 in the heads 17 and 19 of the tube, the gas in the flue 16 containing a maximum of tar fumes, whereas the gas leaving through the flue 18 contains hardly any tar fumes, since the tars are cracked during their passage through the hot zones. The coked pellets leaving through pipe 3 in the rear head 19 of the tube are cooled in conventional manner with water or recirculated gas.

FIG. 3 shows an arrangement in which the coked pellets may very conveniently also be cooled by the cool discharged sand and at the same time this sand can be preheated. The plant shown in FIG. 3 comprises a principal rotary tube 1 in which pellets of a caking coal are coked with hot sand as described with reference to FIG. 1 and the coked pellets are then cooled in a secondary rotary tube 1' with sand discharged from the principal tube 1. The pellets are produced on a pelletizing pan 20 from a suitably finely prepared coal with the possible addition of binders and/or lean clay in the presence of water, the preferred size of pellet being between 20 and 30 mm. The pellets which have a water content of 15 to 25% are predried by flue gases on a drying belt 21, which conveniently runs up a gradient to elevate the pellets while they are being dried.

Having been dried to a final water content of 0 to 10%, the pellets at a temperature of 90 to 100° are introduced into the interior of the rotary tube 1 at its right hand end, FIG. 3, and then conveyed to the left hand end of the tube by conveyor screw 11 in countercurrent to the higher temperature sand. During this process the pellets are coked and, when they have left the rotary tube 1, they are introduced into the left hand end of the secondary tube 1' to be cooled. A conveyor screw 23 in the tube 1' conveys the pellets through the interior 22 to the right hand end of this tube 1' and during their passage through the tube they are cooled by sand travelling in countercurrent thereto. The cooled coked pellets are finally discharged at the right hand end of the rotary tube 1' and deposited on a belt conveyor 24.

Hot sand at a temperature of roughly 950° C. is introduced into the left hand end of the rotary tube 1 and travels contrary to the direction of travel of the pellets. The hot sand heats the pellets to about 900° C. and is itself cooled to about 200° C. At this temperature the sand is introduced into the right hand end of the secondary rotary tube 1' and conveyed through this tube in countercurrent flow to the hot coke pellets. The countercurrent interaction of sand and pellets cools the coke pellets to about 220° C., whereas the sand is preheated to about 650° C. The coke pellets which are discharged from the rotary tube 1' and deposited on the conveyor belt 24 may be finally cooled by spraying them with water, exposing them to humidified air or by treating them with like agents. The preheated sand leaving the rotary tube 1' is further heated with hot gases to 950° C. in a pneumatic conveyor 25, separated from the exhaust gases in a collecting hopper 26 and recharged into the left hand end of the rotary tube 1.

The dust in the exhaust gases leaving the hopper is removed in a cyclone 27, and the exhaust gases are then used in a heat exchanged 28 for preheating the combustion air and finally for drying the pellets on the drying belt 21. Instead of heating the sand in a pneumatic conveyor 25 this might also be done in a fluidized bed.

For keeping the pellets within a given temperature range, a portion of the cooled discharged sand is reintroduced into the rotary tube 1 through openings 30, 31 and 32 by a feeder 29 and conventional feeding devices. The cooled sand mixes with the hot sand and cools this to a given temperature level and raises its heat capacity, the mixture assisting in keeping the pellets for a longer time at the desired temperature level. The reintroduction of the cooled sand into the rotary tube is not dependent upon the association of two rotary tubes, as has been described, but can also be done in a single rotary tube and in conjunction with some other method of cooling the pellets.

FIG. 4 shows a modified form of apparatus which may be used for coking pellets and which may be at the same time used for cooling coked pellets with sand. As in the other embodiments, the apparatus comprises a rotary tube 1 into which the pellets are fed. After having passed through the interior 7 of the rotary tube 1, the pellets are transferred by a conveyor screw 11 into an annular chamber 8 through which they are returned together with the sand by flights 12 to the front end of the rotary tube 1, where they are discharged together with the sand and separated therefrom by screening. The pellets are first charged through a feeder pipe 33 at a metered rate by an electromagnetic vibrator 2 into the interior 7 of the rotary tube at a temperature of 70° C. The pellets are entrained by the conveyor screw 11 and travel through the rotary tube 1 from its left hand end to the right, FIG. 4. The interior 7 of the rotary tube 1 is surrounded by the annular chamber 8 which contains sheet metal flights 12 which convey the sand from right to left. Between the annular chamber 8 and the interior 7 of the rotary tube 1 is a shrouding 6 consisting of alternately disposed axially placed sheet metal and screening strips 9 and 10. At the entry end for the pellets, the interior 7 is divided from the annular chamber 8 by a circular screen 14, through which the vibrator 2 centrally passes. At a temperature of 950° C., the sand is introduced into the right hand end of the rotary tube 1 in metered quantities through an inlet pipe 34 and a screw feeder 4. The sand travels through the rotary tube partly in countercurrent, partly in cross-current and partly in concurrent with the pellets and leaves through an outlet pipe 5. The interior 7 at the entry end for the sand communicates directly with the annular chamber 8 because the inside shrouding 6 does not extend to the extreme end of the rotary tube but leaves an open gap 35 of about 500 mm. in width. Through this gap the coked pellets at a temperature of about 850° C. fall into the annular chamber 8 and are at once entrained by the flights 12 which convey them back towards the pellet entry end of the rotary tube. At first they are heated by the hotter sand to about 870° C. but they then yield their heat again as the sand becomes colder and they are finally discharged through the outlet pipe which directly communicates with the annular chamber 8. The coke issues at a temperature of about 500° C. whereas the sand leaves at about 300° C.

The advantages achieved by this apparatus primarily reside in that fixed flights inside the rotary tube successfully permit the treated bulk feed to be conveyed gently through the rotary tube, that is to say without mechanically disintegrating the same.

Moreover, this apparatus provides an outstandingly favorable heat exchange between the treated bulk feed and the heat carrier material, so that the rotary tube can be used with particular advantage when say solid fuels are to be coked or devolatilized. The employment of fine-grained heat carrier materials permits the gases and/or vapors which evolve during the thermal treatment to be discharged undiluted. This is a particularly useful feature when the gases and/or vapors leaving the rotary tube contain tars, oils or other volatile constituents which it is desired to condense and separate without undue trouble.

Furthermore, chemical reactions can be performed with the admission or discharge of gaseous and/or vaporous substances.

Another advantage is that the heat requirements of this apparatus are relatively low, despite its high performance.

It will be readily understood that the rotary tube might also be operated by the introduction of a fine-grained feed and a coarse-grained heat carrier material.

Having now described the means by which the objects of this invention are obtained, we claim:

1. An apparatus for thermally treating a granular bulk feed comprising a rotary tube, two centrally disposed annular baffles partially closing the axial ends of said tube, a conveyor screw rigidly fitted in said tube, said conveyor screw having flights composed of screens spaced from the inner wall of said tube to form an annular chamber between said conveyor screw and said inner wall, a shrouding separating said chamber from the interior of said tube, said shrouding being composed of alternate strips of sheet metal and screens, fixed helical sheet metal flights in said chamber having a pitch opposite to that of said conveyor screw, and said flights continuously conveying bulk feed axially through said tube in countercurrent flow to a fine-grained heat carrier material whereby said material is repeatedly separated from and then reintroduced into said bulk feed at a point nearer its entry into said tube.

2. An apparatus as in claim 1, said conveyor screw having a linear pitch between 100 and 1000 mm.

3. An apparatus as in claim 2, said conveyor screw having a linear pitch between 300 and 600 mm.

4. An apparatus as in claim 3, said conveyor screw at the bulk feed exit end of said tube having a diameter decreased to that of the internal diameter of the adjacent annular baffle, and a corresponding increase in the height of the flights and a 20 to 50% pitch increase.

5. An apparatus as in claim 4, further comprising baffle screens covering the inner openings of said annular baffles.

6. An apparatus as in claim 5, said baffle screens having a mesh between 3 and 20 mm.

7. An apparatus as in claim 6, said mesh being from 8 to 14 mm.

8. An apparatus as in claim 7, said tube being inclined to the horizontal at an angle between 0 and 10°.

9. An apparatus as in claim 8, said tube being inclined to the horizontal at an angle between 2 and 4°.

10. An apparatus as in claim 9, the height of said chamber being from 2 to 20% of the internal diameter of said tube.

11. An apparatus as in claim 10, the height of said chamber being from 5 to 10% of the internal diameter of said tube.

12. An apparatus as in claim 11, said tube having a length of from 10 to 100 meters.

13. An apparatus as in claim 10, said tube having a length of from 30 to 60 meters.

14. An apparatus as in claim 13, said tube having an internal diameter of from 1 to 6 meters.

15. An apparatus as in claim 14, said tube having an internal diameter of from 3 to 5 meters.

16. An apparatus as in claim 15, said helical sheet metal flights in said chamber being pitched at an angle from 30 to 60° to the longitudinal axis of said tube.

17. An apparatus as in claim 16, said helical sheet metal flights being pitched at an angle of 45° to the longitudinal axis of said tube.

18. An apparatus as in claim 17, said helical sheet metal flights forming pockets having floors pitched at an angle of 45°.

19. An apparatus as in claim 18, further comprising stationary heads at the ends of said tube, and flues in said heads communicating with the interior of said tube for the discharge of gases formed in said tube.

20. An apparatus as in claim 19, further comprising first pipe means in one of said stationary heads for the discharge of treated bulk feed from said tube.

21. An apparatus as in claim 20, further comprising second pipe means in the other of said stationary heads for the discharge of the cooled heat carrier material from said tube.

22. An apparatus as in claim 21, further comprising first feeder means for charging raw bulk feed into said tube, and second feeder means for charging heat carrier material into said tube.

23. An apparatus as in claim 22, further comprising opening means in the circumference of said tube for the introduction of additional heat carrier material into said tube.

24. An apparatus as in claim 23, further comprising an annular gap from 100 to 1000 mm. wide between the said annlar baffles and said shrouding.

25. An apparatus as in claim 24, said annular gap having a width of from 200 to 500 mm.

References Cited

UNITED STATES PATENTS

| | | | |
|---|---|---|---|
| 2,592,783 | 4/1952 | Aspegren | 165—107 |
| 2,872,386 | 2/1959 | Aspegren | 165—107 X |
| 3,401,923 | 9/1968 | Bearce | 263—32 |

EDWARD G. FAVORS, Primary Examiner

U.S. Cl. X.R.

165—107